Jan. 21, 1969     D. L. RINEHART     3,422,985

WASTE COLLECTION ASSEMBLY

Filed April 13, 1965     Sheet _1_ of 2

INVENTOR.
DIXIE L. RINEHART

BY *Richard D. Seibel*

ATTORNEY

Jan. 21, 1969

D. L. RINEHART 3,422,985

WASTE COLLECTION ASSEMBLY

Filed April 13, 1965

INVENTOR
DIXIE L. RINEHART

BY

*Richard D. Seibel*

ATTORNEY

United States Patent Office 3,422,985
Patented Jan. 21, 1969

3,422,985
WASTE COLLECTION ASSEMBLY
Dixie L. Rinehart, Dover, Del., assignor to North American Rockwell Corporation, a corporation of Delaware
Filed Apr. 13, 1965, Ser. No. 447,807
U.S. Cl. 220—63
Int. Cl. B64d *11/02;* A47k *11/02;* B65d *25/16*
12 Claims

ABSTRACT OF THE DISCLOSURE

A cylindrical cannister having a screen separating the interior into two chambers and having a suction connection on a closed one of the chambers is provided. A double wall plastic bag is inserted in the cannister so as to line the inside theretof and be held against the screen by suction. The bag has an impervious double wall portion nearer its open end and a porous closed end having sufficient porosity to pass gases and retain liquids so that a continuous gas flow passes over wastes therein and through the porous portion of the bag. After wastes are deposited in the bag in the cannister, the inner double wall thereof is lifted and the outer double wall remains against the cannister due to the suction for enveloping the porous portion of the bag. Wastes are thereby completely enclosed in an impervious bag without contamination of the surroundings.

---

This invention relates to sanitary collection and retention of wastes. The invention described herein was made in the performance of work under a NASA contract and is subject to the provisions of the National Aeronautics and Space Act of 1958, Public Law 85–568 (72 Stat. 426; 42 U.S.C. 2451) as amended.

In the collection of body wastes during space flight there is a problem of preventing contamination of a spacecraft interior. It is therefore desirable to collect and retain waste material in such a way as to prevent gases, liquids or liquids from entering the spacecraft environment. Although contamination is of particular concern in the confined cabin of a spacecraft, similar considerations require the collection and retention of waste materials in sanitary conditions in hospitals, traveling vehicles of many sorts, in many public places and also in the home.

It is therefore a broad object of this invention to provide a waste collection system that remains sanitary and from which wastes can be removed without contamination of an environment.

Thus in the practice of this invention according to a preferred embodiment there is provided a cylindrical cannister having a comfortable lip structure on an open end. A screen is secured to the inside of the cannister so as to divide the cannister into two chambers. Preferably the screen is in the form of a truncated come having the open larger end of the cone facing the open end of the cannister and the closed smaller end facing the closed end of the cannister. Thus the screen is spaced apart from the walls of the cannister to form an enclosed chamber including the closed end of the cannister. A suction connection is made to the enclosed chamber so that air can be removed therefrom so as to draw air through the screen.

A waste collection bag is fitted within the cannister for the collection and removal of wastes. The waste collection bag in a preferred embodiment comprises a double wall portion of flexible impervious sheet material forming the open end of the bag and a single wall porous sheet material forming the closed end of the bag. The double wall portion of the bag is sealed to the single wall porous portion of the bag around the entire circumference of the bag. The double wall portion of the bag is open at the opposite end. The double wall open portion of the bag fits over the lip structure and the porous closed end of the bag is held against the screen by the suction. The porous portion of the bag preferably will retain liquids and permit the passage of gases. After wastes are accumulated in the bag the inner portion of the double wall structure is withdrawn from the cannister. The suction holds the outer portion of the double wall bag against the lip structure and turns the outer portion of the double wall bag inside out. In withdrawing the inner portion of the bag from the cannister, the porous portion containing the wastes is removed and the outer portion of the bag is pulled over the porous portion. This contains all waste materials in an impervious bag, the ends of which can be twisted or appropriately sealed without escape of any of the waste material.

Such a waste collection system is readily employed as a toilet in spacecraft to prevent body wastes from contaminating the spacecraft interior in zero gravity. Similarly the system is employed as a toilet in trains, buses or airplanes and as a toilet or a receptacle for dressings and tissue in hospitals.

Thus it is a broad object of this invention to provide a sanitary waste collection system.

It is a further object of this invention to provide an improved waste collection bag.

Other objects and many of the attendant advantages of this invention will be readily appreciated as the same becomes better understood by reference to the following detailed description when considered in connection with the accompanying drawings wherein.

Throughout the drawings like numerals refer to like parts.

Figure 1:
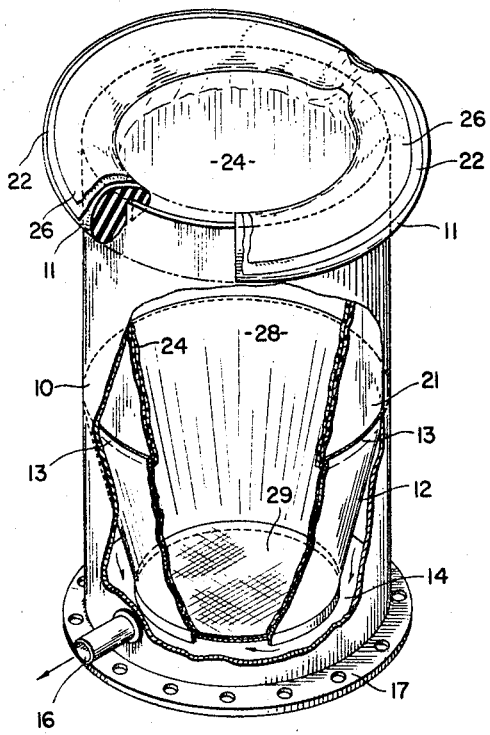
FIG. 1 illustrates a cutaway view of a waste cannister constructed according to the principles of this invention.

FIG. 1 illustrates a waste collection cannister incorporating the principles of this invention. As illustrated in this embodiment there is provided a cylindrical housing 10 which is open at one end and closed at the other end. The open end of the housing has a lip structure 11 which can, for example, be a comfortable rubber lip so that the cannister can be used as a commode. Within the housing there is provided a truncated cone 12 of foraminous material such as a screen for dividing the housing into two chambers. The lare end 13 of the truncated cone is open and is secured to the inside of the housing 10 around the entire periphery of the cone. The smaller end of the cone is closed by a screen and faces the closed end of the cannister 10. A cone formed in this manner defines an enclosed chamber 14 wherein the foraminous screen is spaced apart from the walls of the housing. A suction connection 16 is provided on the housing in communication with the enclosed chamber 14 for drawing a suction on this chamber and pulling air through the screen. A flange 17 is provided on the closed end of the housing for securing the assembly to a floor or the like.

Figure 2:
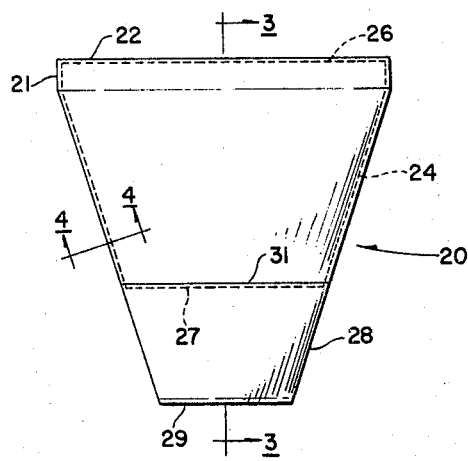
FIG. 2 illustrates a waste collection bag preferred in the practice of this invention.
Figure 3:
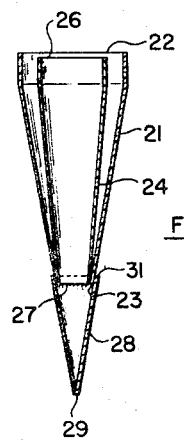
FIG. 3 illustrates a cross sectional view of the waste collection bag of FIG. 2.
Figure 4:
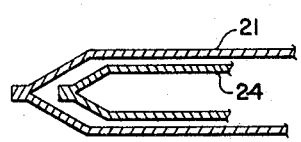
FIG. 4 illustrates a partial cross sectional view of the waste collection bag of FIG. 2.

FIGS. 2 to 4 illustrate a waste collection bag incorporating the principles of this invention. As illustrated in this embodiment there is provided a flat bag 20 of flexible sheet material such as, for example, polyethylene. This bag comprises an outer tube 21, impervious to both gases and liquids, having a relatively larger open end 22 and a relatively smaller end 23. Arranged inside of the outer impervious tube is a slightly smaller inner tube 24, impervious to both gases and liquids, having a relatively larger open end 26 and a relatively smaller end 27. Additionally there is provided a porous bag structure 28 having a substantially trapezodia shape closed at the smaller edge 29 and open at the larger edge 31.

As is seen in FIG. 3 the larger edge 31 of the porous bag is sealed to the smaller end 23 of the outer tube 21 which is in turn sealed to the smaller end 27 of the inner tube 24. The seal is made along the entire peripheral edges of the ends 23 and 27 of the tubes and the open edge 31 of the bag 28. This provides a double wall impervious open portion for one part of the bag and a single wall porous closed portion for the other end of the bag. It will be apparent to one skilled in the art that the sealing of the inner and outer tubes to the porous bag can be in another order than as specifically described. The sealing is preferably by heat welding, and can also be by means of adhesive bonding.

FIG. 4 illustrates a partial cross sectional view of an edge of the bag illustrated in FIG. 2 showing that the double walls are entirely separate except where sealed to the porous bag 28 along the smaller edges 23 and 27. In both FIGS. 3 and 4 the thickness of the sheet material employed to fabricate the bag is greatly exaggerated for purposes of illustration. The thickness of the impervious sheet material is preferably .001 to .005 inch so that the material has reasonable strength yet remains flexible.

In fabricating a bag according to the principles of this invention it is preferred to employ flat sheets of polyethylene material that are heat sealed together according to conventional practice. Two flat sheets are sealed together along two edges to form an inner tube 24. Similarly two flat sheets are sealed together along their edges to form an outer tube 21. These are assembled as illustrated in the partial sectional view of FIG. 4 and a porous bag 28 is sealed to one end of the tubes as illustrated in FIGS. 2 and 3. The porous bag 28 is preferably formed of polyethlene sheet material from .002 to .005 inch thick. This bag is preferably assembled from flat sheets of material and heat sealed on three sides to form an open bag. The open edge of this bag is readily heat sealed to the above described tubes 21 and 24.

The sheet material for the porous bag is preferably one having a sufficiently small pore size to retain liquids under a pressure gradient in the order of one atmosphere and sufficiently porous to permit the passage of gases. Such a material has a pore size of not more than about ten microns for preventing liquid wastes from contaminating the cannister, thereby making the assembly useful for collection of emesis. Such a porous polyethylene is conveniently made by thorough intermixture of finely powdered polyethylene with starch powder having a particle size corresponding to the size of the desired pores. This material is thoroughly intermixed in the form of a slurry, formed into sheets, dried, and heat sintered. After sintering the starch is removed by leaching with acid, leaving a porous polyethlene sheet having the desired pore size. Heat sealing of the porous sheet closes the pores and makes the material impervious only along the edges that are heat sealed.

Figure 5:
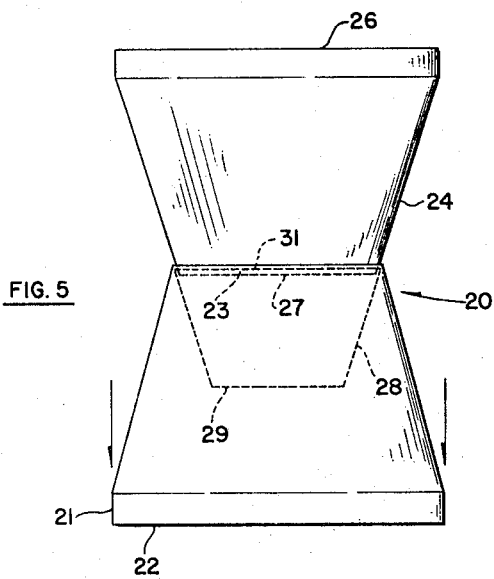
FIG. 5 illustrates a waste collection bag of the type illustrated in FIG. 2 having an outer portion turned inside out.
Figure 6:
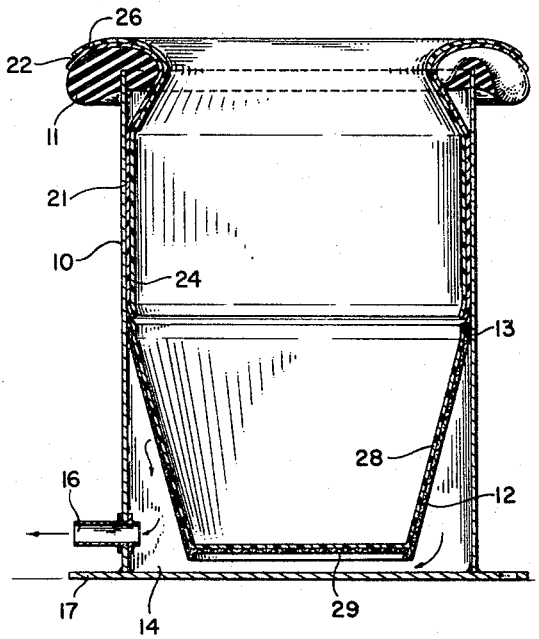
FIG. 6 illustrates a cross sectional view of a waste collection cannister having a waste collection bag installed therein.

FIG. 5 illustrates a waste collection bag fabricated according to the principles of this invention wherein the outer bag is turned inside out. It will also be appreciated that a waste collection bag can be fabricated from an inner tube 24 and an outer tube 21, assembled with a porous bag 28 in the general shape illustrated in FIG. 5, and heat sealed in this geometry. The outer bag 21 can then be turned inside out to form a bag similar to that illustrated in FIG. 2. It can be seen from the illustration of the bag in FIG. 5 that topologically the waste collection bag comprises a tubular member of impervious sheet material having a substantially hour-glass shape. A porous septum is formed in the constricted portion of the hour-glass shape and is sealed around the entire periphery thereof to the tube. It is also clear from the illustration of FIG. 5 that when the outer bag 21 is inside out as illustrated therein that any wastes contained in the porous bag 28 are completely surrounded by impervious material that can readily be sealed at the open ends.
dutites FIG. 6 illustrates a cross sectional view of a waste collection cannister having a waste collection bag assembled therein. As can be seen in this figure the open ends 22 and 26 of the double wall portion of the bag 20 are rolled over the lip structure 11 of the cannister and lie along the inside wall of the housing 10. The porous bag 28 is held against the screen 12 by the suction applied to the chamber 14. Thus the entire open interior of the cannister is lined with polyethylene material. The polyethylene sheet of the bag extends over the lip structure to provide a removable sanitary surface. When employed as a toilet the open end of the cannister is substantially closed by the buttocks of the user and a small volume of air flow through the porous bag and suction connection suffices to retain all waste material within the cannister. When the assembly is used to catch emesis or other wastes a somewhat larger air flow is preferred to minimize escape of material from the cannister.

Figure 8:
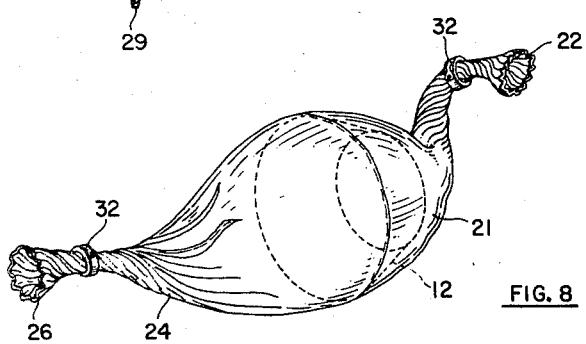
FIG. 8 illustrates a waste collection bag sealed for disposal.
Figure 7:
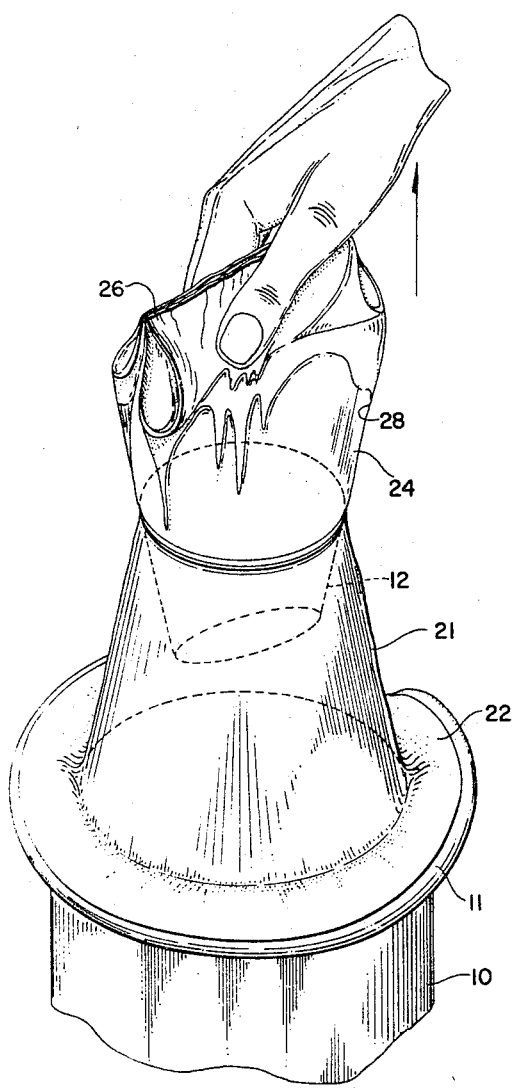
FIG. 7 illustrates withdrawal of a waste collection bag from a cannister.

After wastes are collected in the waste collection bag assembled in the cannister, the open edge of the inner bag is gathered by hand off of the lip structure 11 and, as illustrated in FIG. 7, the inner bag is withdrawn from the cannister leaving the outer bag held against the lip structure by the suction within the cannister. This turns the outer bag inside out and pulls it over the porous bag containing the wastes. As the inner bag is further withdrawn, the outer bag is freed from the lip of the cannister and can be grasped with the other hand. The two open ends 22 and 26 of the outer and inner bags 21 and 24 respectively are individually twisted to provide a seal at each end and prevent wastes contained in the porous bag from escaping. The twisted ends of the bag are readily sealed with wire clips 31 as illustrated in FIG. 8. The waste material contained in the bag is thus completely surrounded by impervious plastic material and is readily disposed of without any escape of the waste products. It should be noted that in withdrawing the inner bag from the cannister and in handling the withdrawn bag, there is no contact between the interior of the bag and the hands of the operator so that no contamination occurs from this source.

It is understood that the above described example is merely illustrative of the application of the principles of this invention. Those skilled in the art may readily devise other variations that will embody the principles of this invention. It is therefore to be understood that within the scope of the appended claims the invention may be practiced otherwise than what is specifically described.

What is claimed is:

1. A waste collection bag comprising: a tube of impervious flexible sheet material open at both ends; and a septum in a mid-portion of said tube having an edge portion sealed at the periphery thereof to said tube, and a center portion extending between the sides of said tube, said center portion being in the form of a deep bag or pouch open at the end sealed to the tube and closed at the opposite end, said septum comprising a material porous to gas and impervious to liquid.

2. A waste collection bag assembly comprising: a lower bag portion of material porous to gas and impervious to liquid and having an upper peripheral edge; and a tubular assembly having double walls of which the lower peripheral edges are sealed to each other and to said upper peripheral edge of the lower bag portion.

3. A waste collection bag assembly comprising:
a substantially hour glass shaped tube of impervious sheet having a constricted central section and open at both ends; a porous septum in the constricted section of said tube having an edge portion sealed at the periphery thereof to said tube,
and a center portion extending between the sides of said tube, said center portion being in the form of a deep bag or pouch open at the end, sealed to the tube and closed at the opposite end.

4. A waste collection bag assembly as defined in claim 3 wherein said porous septum has sufficiently porosity to pass gases, and insufficient porosity to pass liquids.

5. A waste collection bag as defined in claim 4 wherein said tube comprises polyethylene sheet and wherein said septum comprises polyethylene sheet with pores of not more than about ten microns.

6. A waste collection bag assembly comprising:
an inner impervious tube having a relatively larger open end and a relatively smaller open end;
an outer impervious tube having a relatively larger open end and a relatively smaller open end, the smaller open end of said inner tube being joined to the smaller open end of said outer tube around the entire periphery thereof; and
a bag joined to the smaller open ends of said tubes around the entire periphery thereof, said bag having sufficient porosity to pass gases and insufficient porosity to pass liquids.

7. A waste collection system comprising:
a cylindrical housing open at one end and closed at the other end;
a lip structure on the open end of said housing;
a screen in the form of a truncated cone secured to the inside of said housing along the larger edge of the truncated cone, the apex end of the cone extending toward the closed end of said housing, for dividing the inside of said housing into a first chamber including the inside of the cone and the open end of said housing, and a second chamber including the outside of the cone and the closed end of said housing;;
means for applying suction to the second chamber;
two substantially concentrically arranged tubes of flexible impervious sheet material, each of said tubes having a first open edge on said lip structure and a second edge held against said screen by the suction, said second edges being sealed together; and
a porous bag like member sealed at the open edge thereof to said second edges and held against said screen by the suction.

8. A waste collection system comprising:
a housing open at one end and closed at the other end;
a lip structure on the open end of said housing;
a foraminous divider in said housing dividing said housing into one chamber having the open end and another chamber having the closed end;
means for applying suction to the second chamber; and
a flexible bag having an open end on said lip structure and a closed end held against said divider by the suction, said bag comprising an impervious portion adjacent said lip structure and a porous portion adjacent said foraminous divider for continuous gas flow through the porous portion of said bag.

9. A waste collection system as defined in claim 8 wherein the impervious portion of said bag comprises first and second substantially concentric impervious wall portions overlying said lip structure.

10. A waste collection system as defined in claim 9 wherein the porous portion of said bag is sealed to said first and second wall portions and comprises a porous bag-like member held against said foraminous divider by the suction.

11. A waste collection system as defined in claim 8 wherein said porous portion has pores of not more than about ten microns.

12. A flexible bag assembly comprising:
a lower bag portion of permeable flexible material having an upper peripheral edge; and
an upper bag portion having double walls of impermeable flexible material, said double walls at their lower peripheral edges being sealed to each other and connected to the upper peripheral edge of the lower bag portion.

References Cited

UNITED STATES PATENTS

| 2,671,906 | 3/1954 | Potts | 4—142 X |
| 2,801,426 | 8/1957 | Laborce | 4—142 |
| 2,828,858 | 4/1958 | Tooke | 229—56 X |
| 2,924,359 | 2/1960 | Beremand. | |
| 2,997,224 | 8/1961 | Stannard | 229—53 |
| 3,047,188 | 7/1962 | Durbin | 220—63 |
| 3,158,874 | 12/1964 | Bennett | 4—142 |
| 3,229,813 | 1/1966 | Crowe | 229—53 X |

FOREIGN PATENTS

| 728,069 | 4/1955 | Great Britain. |
| 102,218 | 7/1963 | Norway. |

GEORGE E. LOWRANCE, *Primary Examiner.*

U.S. Cl. X.R.

4—10, 142; 229—53